(12) United States Patent
Yano et al.

(10) Patent No.: US 8,219,655 B2
(45) Date of Patent: Jul. 10, 2012

(54) METHOD OF ASSOCIATING MULTIPLE MODALITIES AND A MULTIMODAL SYSTEM

(75) Inventors: Ai Yano, Kawasaki (JP); Tatsurou Matsumoto, Kawasaki (JP); Kazuo Sasaki, Kawasaki (JP); Masayuki Fukui, Kawasaki (JP); Eiichi Takahashi, Kawasaki (JP); Masahiro Hara, Kawasaki (JP); Yutaka Iwayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 215 days.

(21) Appl. No.: 11/928,011

(22) Filed: Oct. 30, 2007

(65) Prior Publication Data

US 2008/0120358 A1 May 22, 2008

(30) Foreign Application Priority Data

Nov. 17, 2006 (JP) ................. 2006-311845

(51) Int. Cl.
*G06F 15/16* (2006.01)
*G06F 15/173* (2006.01)
*G06F 15/177* (2006.01)

(52) U.S. Cl. .............. 709/223; 704/270; 704/270.1; 709/217

(58) Field of Classification Search .......... 709/217–228; 704/270, 270.1
See application file for complete search history.

(56) References Cited

U.S. PATENT DOCUMENTS

| | | | |
|---|---|---|---|
| 5,878,274 A | 3/1999 | Kono et al. | |
| 6,570,870 B1 | 5/2003 | Berstis | |
| 6,807,529 B2 | 10/2004 | Johnson et al. | |
| 7,260,535 B2 * | 8/2007 | Galanes et al. | 704/270 |
| 2005/0102606 A1 * | 5/2005 | Sasaki et al. | 715/500.1 |
| 2005/0203747 A1 * | 9/2005 | Lecoeuche | 704/270.1 |
| 2005/0261909 A1 * | 11/2005 | Sienel et al. | 704/270.1 |

FOREIGN PATENT DOCUMENTS

| | | |
|---|---|---|
| JP | 9-91112 A | 4/1997 |
| JP | 2000-244639 A | 9/2000 |
| JP | 2005-148807 A | 6/2005 |
| JP | 2005-519363 A | 6/2005 |
| WO | 03073198 A2 | 9/2003 |
| WO | 2005/098597 A2 | 10/2005 |

OTHER PUBLICATIONS

Japanese Office Action dated Mar. 22, 2011, issued in corresponding Japanese Patent Application No. 2006-311845 (partial English translation).

* cited by examiner

*Primary Examiner* — Haresh N Patel
(74) *Attorney, Agent, or Firm* — Westerman, Hattori, Daniels & Adrian, LLP

(57) ABSTRACT

The multimodal managing system invention comprises: a modality linking data generating unit that generates association data in order to associate a first modality and a second modality of the plurality of modalities; an association correspondence unit that sends content that includes association data, wherein association data is combined with the content to be sent to the first modality, to the first modality; a session information storage unit that stores the correspondence among the connection information of each modality, the link information about the links between the modalities, and the association data generated by the modality linking data generating unit as a session information table; and a modality associating unit that receives link request data sent from the second modality using the association data included in the content that includes association data, and executes a matching process that compares the link request data with the association data stored in the session information storage unit.

8 Claims, 16 Drawing Sheets

MAINTENANCE AND INSPECTION SERVICE SYSTEM

| REPORT | 11 NEW E-MAILS HAVE ARRIVED. |
|---|---|

| BULLETIN BOARD / TOPICS | RE: PLACEMENT OF ORDER FOR BUSINESS CARD |
| | RE: CHANGE IN UNIT PRICE OF GASOLINE (FROM JUNE 1) |
| | CURRENCY EXCHANGE RATE TABLE (FISCAL MONTH OF SEPTEMBER 2005) |

OPEN PAST LIST

IF SIMULTANEOUSLY USING A SENSOR, PERFORM SENSING OPERATION THREE TIMES.
IF SIMULTANEOUSLY USING A VIDEO CAMERA, SHOOT VIDEO FOR 10 SECONDS.

— 1002

MAINTENANCE SERVICE
FAULT DIAGNOSIS
PARTS LIST
CYCLIC INSPECTION

DRAWING REFERENCE
LAYOUT DRAWING

ARTICLE MANAGEMENT SERVICE
INVENTORY SEARCH

INVENTORY-IN REGISTRATION

DAILY WORK SCHEDULE
E-MAIL
REPORT GENERATION

TEL.03-1234-5678
FAX.03-1234-6789

MAINTENANCE AND INSPECTION SERVICE SYSTEM

| REPORT | 11 NEW E-MAILS HAVE ARRIVED. |
|---|---|
| BULLETIN BOARD / TOPICS | RE: PLACEMENT OF ORDER FOR BUSINESS CARD |
| | RE: CHANGE IN UNIT PRICE OF GASOLINE (FROM JUNE 1) |
| | CURRENCY EXCHANGE RATE TABLE (FISCAL MONTH OF SEPTEMBER 2005) |

OPEN PAST LIST

MAINTENANCE SERVICE
FAULT DIAGNOSIS
PARTS LIST
CYCLIC INSPECTION

DRAWING REFERENCE
LAYOUT DRAWING

ARTICLE MANAGEMENT SERVICE

INVENTORY SEARCH

INVENTORY-IN REGISTRATION

DAILY WORK SCHEDULE
E-MAIL
REPORT GENERATION

TEL.03-1234-5678
FAX.03-1234-6789

IF SIMULTANEOUSLY USING A CAMERA, SHOOT THIS IMAGE.

MAINTENANCE AND INSPECTION SERVICE SYSTEM

| | |
|---|---|
| REPORT | 11 NEW E-MAILS HAVE ARRIVED. |
| BULLETIN BOARD / TOPICS | RE: PLACEMENT OF ORDER FOR BUSINESS CARD |
| | RE: CHANGE IN UNIT PRICE OF GASOLINE (FROM JUNE 1) |
| | CURRENCY EXCHANGE RATE TABLE (FISCAL MONTH OF SEPTEMBER 2005) |

OPEN PAST LIST

IF SIMULTANEOUSLY CONDUCTING VOICE DIALOGUE, ANSWER THIS QUESTION. "WHAT IS YOUR HOBBY?" — 1302

MAINTENANCE SERVICE
FAULT DIAGNOSIS
PARTS LIST
CYCLIC INSPECTION

DRAWING REFERENCE
LAYOUT DRAWING

ARTICLE MANAGEMENT SERVICE

INVENTORY SEARCH

INVENTORY-IN REGISTRATION

DAILY WORK SCHEDULE
E-MAIL
REPORT GENERATION

TEL.03-1234-5678
FAX.03-1234-6789

METHOD OF ASSOCIATING MULTIPLE MODALITIES AND A MULTIMODAL SYSTEM

BACKGROUND OF THE INVENTION

1. Field of the Invention

The present invention is a multimodal service that provides a user with information and services through a network using a plurality of different modalities, and relates to a method that can easily interlink multiple modalities that differ from one another.

2. Description of the Related Art

When providing a user with information and services through a network, it is conceivable to configure the system so that information is sent and received in the interactive communication, i.e., content that is sent from a server side is displayed on a monitor, such as a CRT or LCD monitor, that is provided to a terminal on the user side, and information that is input by the user by using a keyboard, a mouse, and other input interfaces that are provided to the terminal on the user side is received on the server side. It is possible with such a visual interface, which makes use of the display of images, to display an information list on the monitor, which is advantageous in that it is easy to recognize, acquire, and select needed information from the information list. Nonetheless, it is disadvantageous in that the data input using the keyboard and the input operation using a pointing device, such as the mouse, or another input interface is complicated, and users who are not used to such operation require a great deal of time for the input operation.

In addition, it is also possible to provide a voice interface that is configured so that the terminal on the user side outputs content sent from the server side as voice and receives input of the user's voice. A typical example of such a voice interface is a telephone terminal, which is advantageous in that dialogue can advance by the voice interface and therefore manual input is not needed and operation is simple; however, it is disadvantageous in that the output sent from the server side is also configured as a time series output of voice, which makes it impossible to display the list of information or to easily recognize, acquire, or select needed information.

To make it possible for anyone to receive information and services simply and rapidly, it is preferable to simultaneously use the plurality of different modalities (interfaces) discussed above and to take advantage of their respective merits.

Such a system that makes it possible to provide information and services by synchronizing multiple, different modalities has been proposed in, for example, Patent Document 1 (Japanese Published Unexamined Patent Application No. 2005-148807). The system in Patent Document 1 is configured so that selection definition information, which corresponds to a content generation file for each modality, is prepared in advance, and the content generation files to be applied in accordance with the combination of the modalities to be synchronized are selected and output, thereby making it possible to provide information and services by synchronizing multiple modalities.

Normally, such a system is configured so that the session information for each modality of the plurality of modalities is managed individually, each of the modalities is individually authenticated, and the modalities are then associated based on, for example, information about the user who is using the terminal. Accordingly, there is a problem in that, when each individual modality starts a session, it cannot be linked to other modalities.

To solve such a problem, it is conceivable that when the user originates a call using one modality, an identifier number of the terminal is registered on the server side, and when the same user connects to the server side using another modality, the registered terminal identifier number is sent and the server side thereby recognizes that the two modalities belong to the same session, which makes it possible to interlink the modalities. The following explains how the modalities were linked in the past by taking as an example a case wherein a voice interface is linked to a visual interface.

(1) Authentication Using a Call Originator Number

The example shown in FIG. 15 is configured so that the user side comprises a voice terminal M1, which constitutes a voice interface, and a display terminal M2, which constitutes a visual interface. The voice terminal M1 is connected to a voice dialogue server S1 and comprises a voice output unit that uses voice to output content sent from the voice dialogue server S1, an input unit that receives input using the voice input of the user or DTMF (dual-tone multi frequency), and a data sending and receiving unit that sends and receives the voice content and the user's input to and from the voice dialogue server S1. The display terminal M2 is connected to a voice and visual dialogue server S2 and comprises: a display unit that displays content that includes, for example, image data and text data sent from the voice and visual dialogue server S2; an input unit that receives the input of user data; and a data sending and receiving unit that sends and receives content and input data received from the user to and from the voice and visual dialogue server S2.

Based on a dialogue scenario that is managed by the voice and visual dialogue server S2, the voice dialogue server S1 acquires corresponding content, sends it as voice content to the voice terminal M1, interprets the user input sent from the voice terminal M1 and sends such to the voice and visual dialogue server S2 as input data.

The voice and visual dialogue server S2 manages the dialogue scenario with the user side about the service to be provided and, in accordance with requests from the voice terminal M1 and the display terminal M2, sends the corresponding content, advances the dialogue scenario in accordance with the input data from the voice terminal M1 and the display terminal M2, and manages the correspondence between the voice terminal M1 and the display terminal M2.

When the user originates a call using the voice terminal M1, the voice dialogue server S1 generates a call originator identifier (caller ID) based on the call originator number of the voice terminal M1 and sends the call originator identifier (caller ID) to the voice and visual dialogue server S2 for registration. The voice dialogue server S1 sends voice guidance to the voice terminal M1 to prompt the user to startup the display terminal M2 and connect the display terminal M2 to the voice and visual dialogue server S2.

If the user starts up the display terminal M2 and establishes a connection between the display terminal M2 and the voice and visual dialogue server S2, then the voice and visual dialogue server S2 sends content to the display terminal M2 that prompts the user to input the call originator number (call originator number of the voice terminal M1), searches for the corresponding call originator identifier (caller ID) based on the call originator number input by the user, generates a user identifier (user ID) for the display terminal M2, associates the generated user identifier (user ID) and the call originator identifier (caller ID), and registers that association. Simultaneously, the voice and visual dialogue server S2 sends the generated user identifier (user ID) to the display terminal M2.

Subsequently, the synchronization of the content sent to the voice terminal M1 and the display terminal M2 in accordance with the dialogue scenario makes it possible to provide information and services via multiple modalities that are linked.

(2) Authentication Using a One-time Password

Similar to authentication that uses a call originator number as discussed above, the example shown in FIG. 16 is configured so that the user side comprises a display terminal M3, which constitutes a visual interface, and a voice terminal M4, which constitutes a voice interface. The display terminal M3 is connected to the voice and visual dialogue server S3 and comprises: a display unit that displays content that includes, for example, image data and text data sent from the voice and visual dialogue server S3; an input unit that receives the input of user data; and a data communication unit that sends and receives content and user input data to and from the voice and visual dialogue server S3. In addition, the voice terminal M4 is connected to a voice dialogue server S4 and comprises: a voice output unit that uses voice to output content sent from the voice dialogue server S4; an input unit that receives the input of either a user's voice or DTMF (dual-tone multi frequency); and a data sending and receiving unit that sends and receives voice content and user input to and from the voice dialogue server S4.

Based on a dialogue scenario managed by the voice and visual dialogue server S3, the voice dialogue server S4 acquires corresponding content, sends such as voice content to the voice terminal M4, and sends the user input sent from the voice terminal M4 to the voice and visual dialogue server S3.

The voice and visual dialogue server S3 manages the dialogue scenario with the user side regarding the service to be provided, sends corresponding content in accordance with requests from the display terminal M3 and the voice terminal M4, advances the dialogue scenario in accordance with data input from the display terminal M3 and the voice terminal M4, and manages the correspondence between the display terminal M3 and the voice terminal M4.

When the user uses the display terminal M3 to connect to the voice and visual dialogue server S3, the voice and visual dialogue server S3 generates a one-time password (receipt number) that corresponds to that session, generates a user identifier (user ID) for the corresponding display terminal M3, registers the correspondence therebetween, and then sends that correspondence to the display terminal M3.

Next, if the user originates a call using the voice terminal M4, then the voice dialogue server S4 generates a call originator identifier (caller ID) based on the call originator number of the voice terminal M4, sends the call originator identifier (caller ID) to the voice and visual dialogue server S3, and registers such. The voice dialogue server S4 sends voice guidance to the voice terminal M4 that prompts the user to input a one-time password. If the voice terminal M4 is provided with a button as in, for example, a telephone terminal, then it is possible to adopt a configuration wherein the one-time password can be received by DTMF (dual-tone multi frequency). The voice dialogue server S4 sends the one-time password input by the voice terminal M4 to the voice and visual dialogue server S3. At the voice and visual dialogue server S3, if the one-time password generated for the session with the display terminal M3 and the one-time password sent from the voice dialogue server S4 match, then the corresponding user identifier (user ID) and call originator identifier (caller ID) are associated and registered.

Subsequently, synchronizing the content sent to the display terminal M3 and the voice terminal M4 in accordance with the dialogue scenario makes it possible to provide information and services with multiple linked modalities.

With the two methods discussed above, it is necessary to manually input, for example, the call originator number and the one-time password, which is troublesome and also carries the risk of input error.

In addition, if multiple modalities are associated by performing "(1) Authentication Using a Call Originator Number," then it is necessary to input the call originator number at the display terminal M2. With the example discussed above, it is assumed that the display terminal M2 is provided with an input unit that uses a keyboard or a pointing device such as a mouse; however, if a modality is not provided with such an input device, then there is a problem in that it is not possible to authenticate the modality as one that is being handled by the same user.

For example, in the case of a system, such as a maintenance and management system or a business management system, wherein the object of management is on-site state information that is acquired from image data taken by an on-site video camera or from one of a variety of sensors and the content to be sent is selected on the server side using such image data, state information, and the like, it is necessary to consider, in addition to the abovementioned display and voice interfaces, the inclusion of other interfaces, such as a video camera for acquiring video data and a sensor interface for acquiring a variety of on-site state information, in the plurality of modalities. There are many cases wherein such a video camera, a sensor interface, and the like do not comprise input devices for inputting data, and there is consequently a risk that it will not be possible to perform the process of associating the abovementioned other interfaces with other modalities.

Likewise, if multiple modalities are associated by performing "(2) Authentication Using a One-time password," then it is necessary to input the one-time password at the voice terminal M4; however, with a modality that is not provided with a means that is capable of manual input, such as an input button, it is impossible to input the one-time password using DTMF, which makes it impossible to authenticate the modality as one that is being handled by the same user. In addition, even if the voice dialogue server S4 side is provided with a voice recognition function, it is necessary to collect a voice sample from the user in advance and to perform voice recognition based thereon, and therefore there are problems in that it is difficult to apply voice recognition to the process of authenticating the terminal at the time that a connection is being made and in that it is of course impossible to employ voice recognition in a modality that is not provided with a voice input/output function.

It is an object of the present invention to provide a method and a system that can easily associate multiple, different modalities and that provide information and services simply and rapidly by simultaneously using multiple, different modalities.

SUMMARY OF THE INVENTION

A method of associating multiple modalities according to the present invention sends content that corresponds to multiple, simultaneously connected, different modalities and receives input data sent therefrom, and thereby is capable of providing information and services via a network based on a prescribed dialogue scenario that is synchronized among the modalities; in addition, the method comprises: a step that, based on a connection request from a first modality of the plurality of modalities, generates a first connection identifier and stores the correspondence between the first connection identifier and the first modality as a session information table; a step that generates association data needed in order to associate the second modality and the first modality of the plurality of modalities, updates the session information table so that the association data and the first connection identifier correspond, generates content that includes association data, wherein the association data is combined with the content to be sent to the first modality, and then sends such to the first modality; a step that receives link request data that was sent by the second modality using the association data included in the content that includes association data sent to the first modality, compares the link request data and the association data stored in the session information table, and determines whether to associate the second modality with the first modality; and a step that, if it is determined to associate the second modality with the first modality, generates a second connection identifier for the connection with the second modality, and updates the session information table with the link information that establishes a correspondence between the second connection identifier and the first connection identifier.

In this case, taking the input/output unit of the second modality that is to be associated with the first modality into consideration, association data is generated in a data format that corresponds to the input/output unit and combined with the content to be sent to the first modality, which makes it possible to easily associate the second modality with the first modality and simplifies the provision of information and services with multiple linked modalities.

A program according to the present invention causes a computer to execute a method of associating multiple modalities in a multimodal managing system that sends content that corresponds to multiple, simultaneously connected, different modalities and receives input data sent therefrom, and thereby is capable of providing information and services via a network based on a prescribed dialogue scenario that is synchronized among the modalities; in addition, the program comprises: a step that, based on a connection request from a first modality of the plurality of modalities, generates a first connection identifier and stores the correspondence between the first connection identifier and the first modality as a session information table; a step that generates association data needed in order to associate the second modality and the first modality of the plurality of modalities, updates the session information table so that the association data and the first connection identifier correspond, generates content that includes association data, wherein the association data is combined with the content to be sent to the first modality, and then sends such to the first modality; a step that receives link request data that was sent by the second modality using the association data included in the content that includes association data sent to the first modality, compares the link request data and the association data stored in the session information table, and determines whether to associate the second modality with the first modality; and a step that, if it is determined to associate the second modality with the first modality, generates a second connection identifier for the connection with the second modality, and updates the session information table with the link information that establishes a correspondence between the second connection identifier and the first connection identifier.

Adapting the program of the method that associates such multiple modalities to a computer system makes it possible to easily associate multiple modalities that are used by a user and to provide information and services with multiple linked modalities and easy input/output.

Furthermore, the program can comprise a selection modality table that, for each content item, establishes a correspondence with a modality of the plurality of modalities that can be linked; wherein the association data is generated based on the selection modality table.

In this case, for each content item, association data is generated with respect to the modalities that can be linked, which makes it possible to easily associate and reliably link modalities.

In addition, the program can comprise a step that acquires positional information of the plurality of modalities; wherein, based on the positional information of the plurality of modalities, only the modality that is at a prescribed position with respect to the first modality is selected and association data is generated therefor.

For example, if each modality is provided with GPS or some other means of detecting positional information, then it is possible to acquire this positional information, identify whether a location where multiple modalities are to be associated is a location where at least one user is within a reasonable service range, and thereby to eliminate, for example, spoofing and illegal access.

A multimodal managing system according to the present invention sends content that corresponds to multiple, simultaneously connected, different modalities and receives input data sent therefrom, and thereby is capable of providing information and services via a network based on a prescribed dialogue scenario that is synchronized among the modalities; in addition, the system comprises: a modality linking data generating unit that generates association data in order to associate a first modality and a second modality of the plurality of modalities; an association correspondence unit that manages connection information related to connections with each modality and link information related to links between modalities, acquires content to be sent to the first modality, and sends content that includes association data, wherein association data combined with the acquired content, to the first modality; a session information storage unit that stores the correspondence among the connection information of each modality managed by the association correspondence unit, the link information about the links between the modalities, and the association data generated by the modality linking data generating unit as a session information table; and a modality associating unit that receives link request data sent from the second modality using the association data included in the content that includes association data, executes a matching process that compares the link request data with the association data stored in the session information storage unit, and updates the session information table stored in the session information storage unit based on the matching results.

With such a configuration, association data is combined with content to be sent to one modality and then sent thereto, link request data from another modality is sent using the association data, and a matching process is performed, which makes it possible to easily and reliably perform the work of associating multiple modalities.

The present invention simplifies the association of modalities when a user links multiple modalities and receives information and services.

BRIEF DESCRIPTION OF THE DRAWINGS

FIG. 10 is an explanatory diagram of a screenshot of content used in the second embodiment of the present invention FIG. 11 is an explanatory diagram of a screenshot of content used in the third embodiment of the present invention.

FIG. 13 is an explanatory diagram of a screenshot of content used in the fifth embodiment of the present invention.

DETAILED DESCRIPTION OF THE PREFERRED EMBODIMENTS

<Outline of the Configuration of a Multimodal Managing System>

Figure 1:
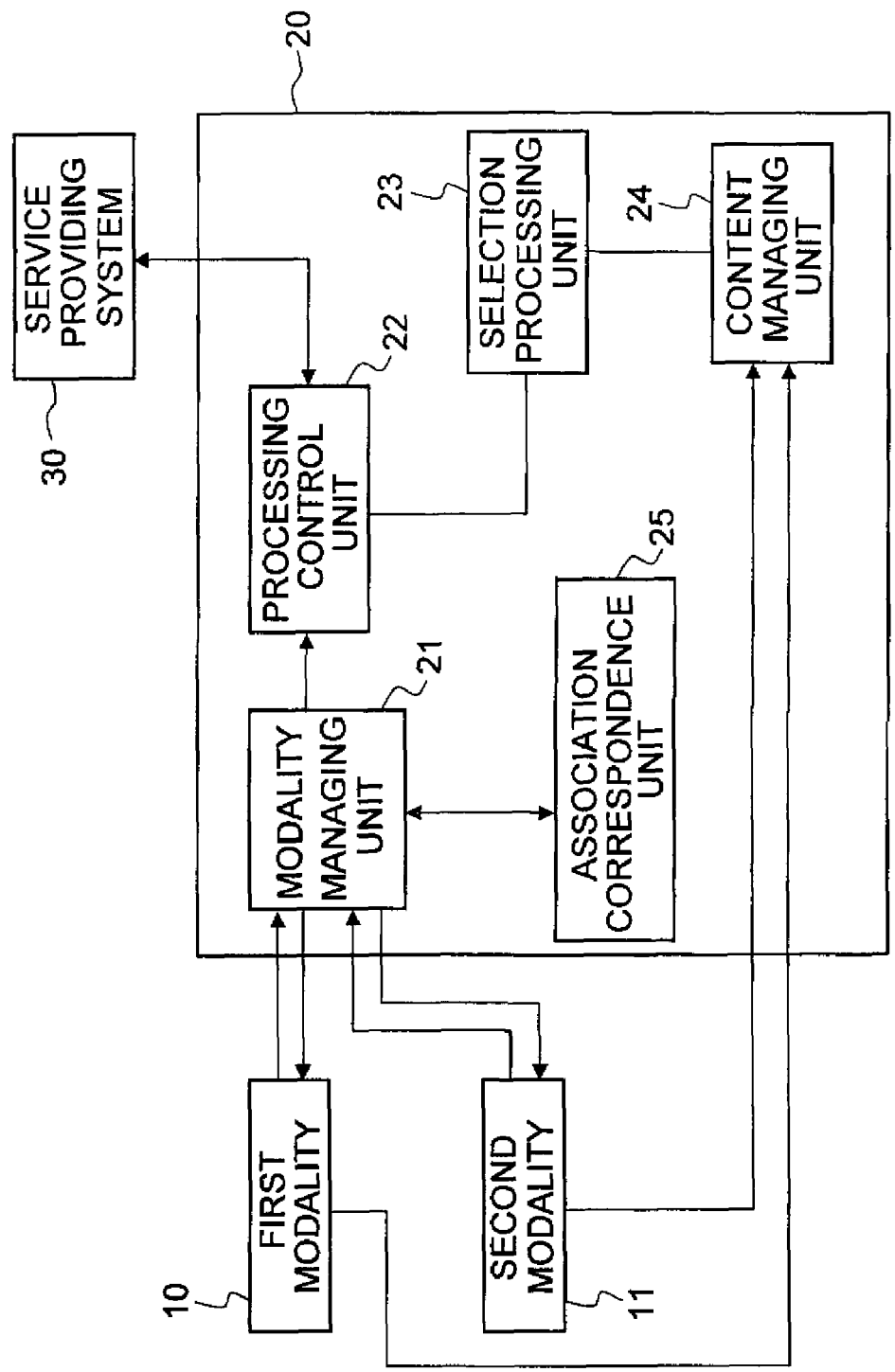
FIG. 1 is a control block diagram that shows a rough configuration of a multimodal managing system according to the present invention.

FIG. 1 shows the configuration of a multimodal managing system that provides information and services that are synchronized for multiple, different modalities.

A first modality 10 and a second modality 11 are illustrated as representative of multiple modalities that can be used by a user. The first modality 10 and the second modality 11 can be adapted to, for example, a display terminal that is provided with a Web browser, a voice terminal, such as a telephone terminal that is capable of voice dialogue, a video camera that is capable of sending shot image data, or any one of a variety of sensors that are capable of acquiring and sending on-site state information.

A service providing system 30 manages a dialogue scenario in order to provide information and services, executes a prescribed process based on the dialogue scenario and information input from each modality, and provides corresponding content to the first modality 10 and the second modality 11.

A server 20 performs control so that the information and services provided to the first modality 10 and the second modality 11 from the service providing system 30 are synchronized, and comprises a modality managing unit 21, a processing control unit 22, a selection processing unit 23, a content managing unit 24, and an association correspondence unit 25.

The modality managing unit 21 manages the session information for each modality of the multiple modalities currently being synchronized, and synchronizes the corresponding modalities. For example, for multiple modalities that are determined to be used by the same user, the modality managing unit 21 manages a table that associates an identifier of those modalities with one synchronization ID, and, based on the information of this table, controls the data input from each modality and the content to be sent to each modality.

The processing control unit 22 receives the data input from each modality via the modality managing unit 21, causes a process to be executed in the service providing system 30, and receives the execution result and sends such to the selection processing unit 23.

Based on the execution result transferred from the processing control unit 22, the selection processing unit 23 executes a selection definition file in order to select a content generation file, and, based on the definition details of the selection definition file, extracts the content generation file to be sent to the corresponding modalities.

The content managing unit 24 generates content, which reflects the execution result transferred from the processing control unit 22, in the content generation file extracted by the selection processing unit 23 and sends such to each corresponding modality.

If there are connection requests from the first modality 10 and the second modality 11, then the association correspondence unit 25 executes a process to authenticate each modality; if this authentication process is successful, then the association correspondence unit 25 manages a session information table that associates the modality identifiers and the connection identifier. In addition, if it is determined that the sessions from the multiple modalities are, for example, from the same user, then the association correspondence unit 25 generates link information in order to associate the session information from these modalities and updates the session information table.

If there are such requests from the modalities to connect to a server 20, then the association correspondence unit 25 executes the authentication process, generates a session ID after authentication is successful, and performs management by storing such as a session information table in a prescribed storing means, If link request data is received from a modality that makes a request to be linked to another modality that is already connected, then the association correspondence unit 25 updates the session information table with the link information that associates the session information of each of the modalities.

When synchronizing the multiple modalities and executing the dialogue process with each of the modalities, the modality managing unit 21, while referencing the session information table managed by the association correspondence unit 25, provides information and services that are synchronized for each of the modalities in accordance with the dialogue scenario managed by the service providing system 30.

Herein, the service providing system 30 can be configured as an information and services providing system that is connected to the server 20 via a network, or as a system that is included in the server 20.

In addition, for each modality, it is possible to provide a dialogue server that relays data input from the modality and content from the server 20 side. For example, it is possible for a voice dialogue modality that conducts dialogue using voice to conduct the dialogue smoothly without being affected by traffic delays by providing a voice dialogue server between the modality and the server 20 and temporarily relaying voice input from the modality side and voice response content from the server 20 side. In addition, in a case wherein a video camera is set up as a modality, it is possible to configure the system so that a video server is provided between the modality and the server 20, and so that the data of the video shot by the video camera is temporarily accumulated in the video server. If the moving picture data is sent in real time, then there is a risk that the burden on the line will become large, and the problem of, for example, dropped frames will arise; however, for the portion of such video data that does not need to be sent in real time, configuring the system so that such data is temporarily accumulated in the video server and then batch downloaded to the server 20 side makes it possible to reliably acquire the video data.

Such a dialogue server may be configured so that it exists independently on the network; in addition, it can be provided in a terminal that includes a modality or on the server 20 side.

<Outline of the Configuration of an Association Correspondence Unit>

Figure 2:
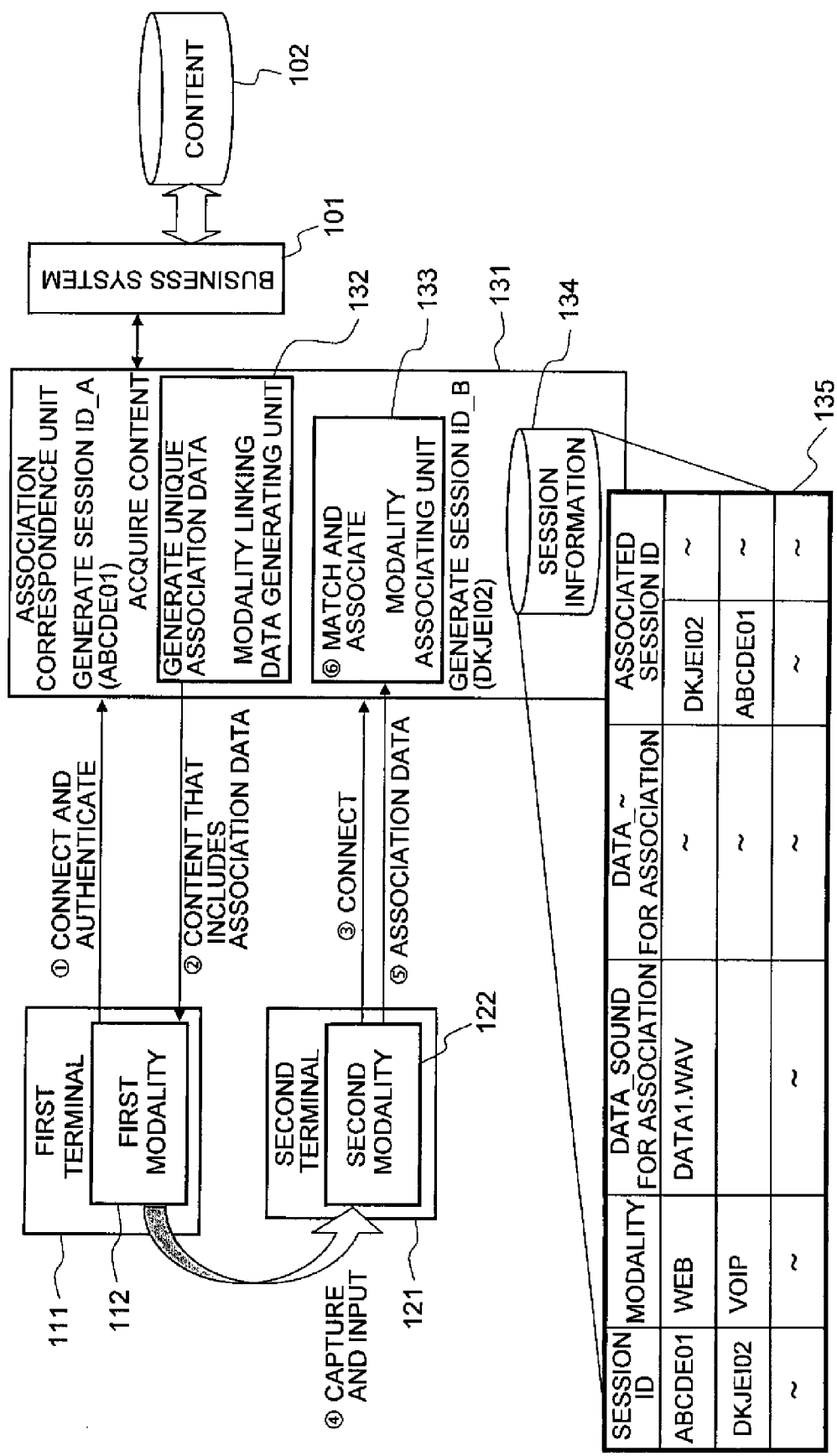
FIG. 2 is a control block diagram that focuses on an association correspondence unit of the multimodal managing system according to the present invention.

The multimodal managing system according to the present invention will now be explained, focusing on the association correspondence unit and referencing the illustrated embodiments. FIG. 2 is a control block diagram of the multimodal managing system according to the first embodiment of the present invention.

In FIG. 2, with the exception of the function block of the association correspondence unit, function blocks in the servers of the multimodal managing system are omitted. In addition, an embodiment is shown wherein a business system 101 is illustrated as an example of a service providing system, two terminals are disposed on the user side, and two different modalities are provided.

The business system 101 integrates and manages, for example, inventory control and accounting information and executes an information process based on the modalities of the terminals operated by the user and on the prescribed dialogue scenario. Based on the input data from the modalities sent via the server (herein, an association correspondence unit 131), the business system 101 executes the prescribed information process, sends the result thereof to the server side, and, in accordance with a request from the server side, selects content from a content storage unit 102 to be sent to the modalities and then sends such.

A first terminal 111 and a second terminal 121 are disposed on the user side, and a first modality 112 and a second modality 122 are installed in the first terminal 111 and the second terminal 121, respectively.

The association correspondence unit 131 that corresponds to the association correspondence unit 25 in FIG. 1 comprises a modality linking data generating unit 132, a modality associating unit 133, and a session information storage unit 134.

The modality linking data generating unit 132 generates association data in order to associate the first modality 112 and the second modality 122 of the multiple modalities.

The association correspondence unit 131 manages connection information for connecting to each of the modalities as well as link information related to the links between modalities, acquires content from the business system 101 that is to be sent to the first modality 112, generates content that includes association data, wherein the association data generated by the modality linking data generating unit 132 is combined with this content, and sends such to the first modality 112.

Using the association data included in the content that includes association data, the modality associating unit 133 receives the link request data sent from the second modality 122, executes a matching process that compares this link request data with the association data sent to the first modality 112, and generates link information that associates the first modality 112 and the second modality 122.

The session information storage unit 134 stores the correspondence between the connection information of each of the modalities managed by the association correspondence unit 131, the link information between each of the modalities, and the association data generated by the modality linking data generating unit 132 as a session information table. For example, a session information table 135 shown in the figure can be configured so that it includes items such as the connection identifier (session ID), a modality type, an association data name, and an associated session ID.

Figure 8:
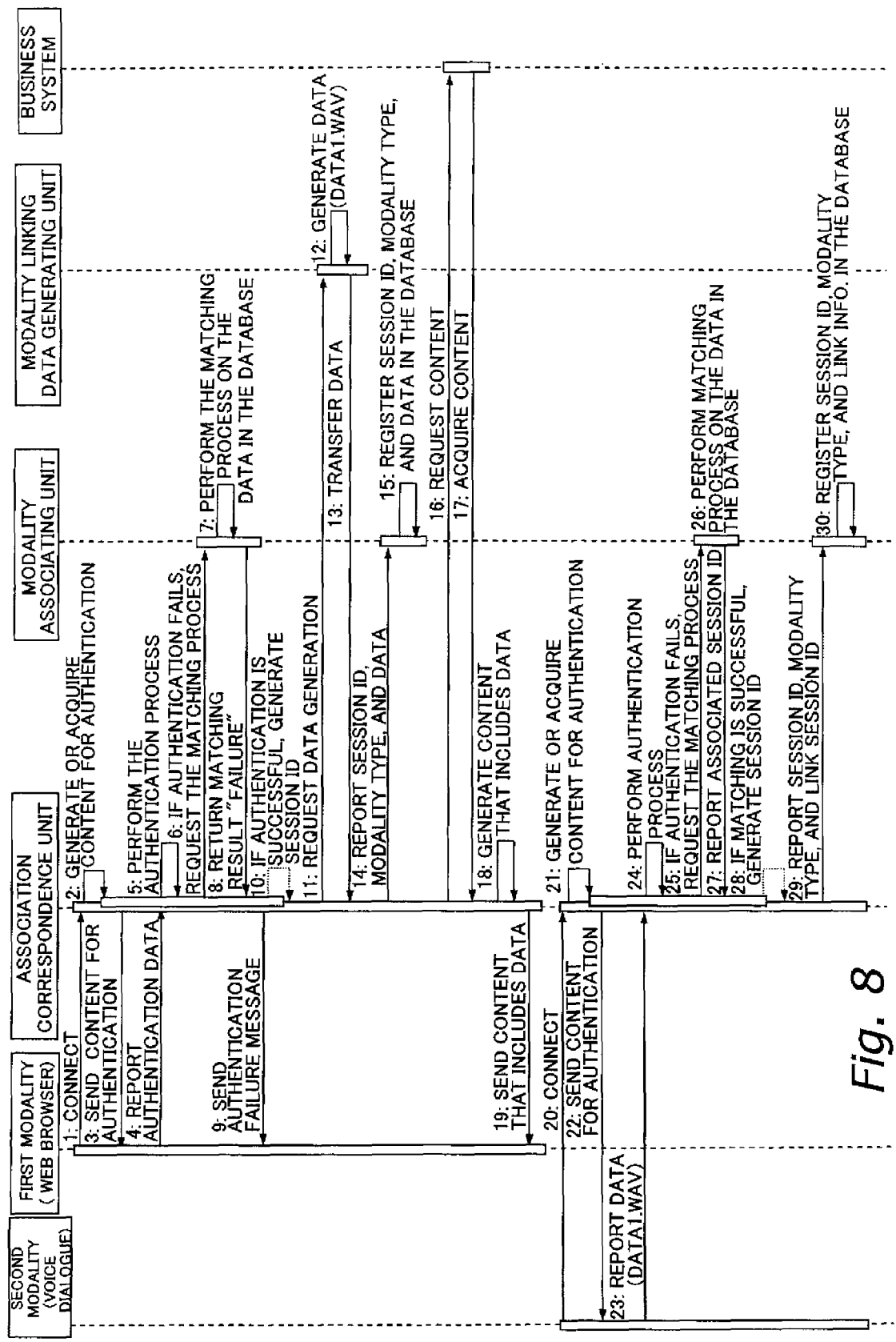
FIG. 8 is a flow chart of the multimodal managing system according to the present invention.

The procedure for associating multiple modalities in a multimodal managing system so configured will now be explained, referencing the flow chart depicted in FIG. 8.

If the user uses the first modality 112 installed in the first terminal 111 to access the server, then a connection request is sent from the first modality 112 of the first terminal 111 to the association correspondence unit 131 (1: connect).

The association correspondence unit 131 either generates authentication content in accordance with the connection request from the first modality 112 or acquires authentication content from the business system 101 side (2: generate or acquire authentication content) and sends this authentication content to the first modality 112 (3: send authentication content). This authentication content is configured so that it specifies the user and prompts him or her to input preset data in order to perform authentication, e.g., in the case of a modality wherein a Web browser is started up on a computer terminal, content that provides data input fields (wherein a user ID and a password can be input) on a page displayed by the browser can be sent as the authentication content.

The association correspondence unit 131 receives the authentication data that was sent by the user via the first modality 112 (4: report authentication data) and executes the authentication process by comparing this authentication data with preset verification data stored in a prescribed storing means (5: perform the authentication process).

If the authentication process with respect to the connection request from the first modality 112 fails, then the association correspondence unit 131 requests the modality associating unit 133 to perform the matching process on the data (6: if authentication fails, request the matching process). The modality associating unit 133 references the session information table in the session information storage unit 134 and performs a search to determine whether the session information exists for the modality to be associated (7: perform the matching process on the data in the database) and transfers the matching result to the association correspondence unit 131. Here, it is expected that the relevant session information does not exist, and the matching therefore results in failure (8: return the matching result "failure"). Thereafter, the association correspondence unit 131 sends an authentication failure message to the first modality 112 from which the connection request data was sent (9: send authentication failure message). At this time, the authentication failure message can be set in the association correspondence unit 131 to content that gives a report of the generated authentication failure, or can be configured so that the relevant content is acquired from the business system 101 side.

If the authentication process with respect to the connection request from the first modality 112 succeeds, then the association correspondence unit 131 generates a connection identifier (session ID) for the first modality 112 (10: if authentication is successful, generate session ID) and requests the modality linking data generating unit 132 to generate association data for associating the first modality 112 with other modalities (herein, the second modality 122) (11: request data generation).

Based on the data generation request from the association correspondence unit 131, the modality linking data generating unit 132 uses the data sent to the first modality 112 to generate association data that can be input to the second modality 122 as link request data (12: generate data). For example, if the second modality 122 is a voice dialogue modality, then it can be configured so that it generates sound data in wav format or sound data that is compressed in a prescribed compression format such as MP3. The modality linking data generating unit 132 transfers the generated association data to the association correspondence unit 131 (13: transfer data).

The association correspondence unit 131 reports the connection identifier (session ID) generated for the connection with the first modality 112, the modality type of the first modality 112, and the data of the association data generated by the modality linking data generating unit 132 to the modality associating unit 133 (14: report session ID, modality type and data). The modality associating unit 133 correlates the session ID, the modality type, and the data, which were reported by the association correspondence unit 131, and stores such in the session information storage unit 134 as a session information table (15: register session ID, modality type and data in the database).

Subsequently, if the second modality 122 needs to link to the first modality 112 or to make it possible for the user to link to the second modality 122 as he or she wishes, the content to be sent to the first modality 112 is combined with the previously discussed association data and is then sent to the first modality 112. When sending the association data generated by the modality linking data generating unit 132, the association correspondence unit 131 makes a request to the business system 101 for content to send to the first modality 112 (16: request content) and the business system 101 acquires the selected content from the content storage unit 102 (17: acquire content).

The association correspondence unit 131 generates content that includes association data (18: generate content that includes data), wherein the association data is combined with the content acquired from the business system 101, and sends such to the first modality 112 (19: send content that includes data).

If there is a connection request from the second modality 122 (20: connect), then the association correspondence unit 131 either generates authentication content or acquires authentication content from the business system 101 (21: generate or acquire authentication content) and sends this authentication content to the second modality 122 (22: send authentication content). This authentication content is configured so that it specifies the user and prompts him or her to input preset authentication data, e.g., if the second modality 122 is a voice dialogue modality, then the authentication content can be configured so as to prompt the user by voice guidance to input authentication request data, such as the user ID and password, by DTMF. In addition, in order to make an association with the first modality 112, the authentication content can be configured so as to prompt the user to input link request data using the association data sent to the first modality 112. By configuring the system in advance so that it is possible to select the input of authentication request data and link request data, it is possible to use the same system for the case wherein an associations is made with other modalities and for the case wherein each modality is independently connected.

If the user uses the first modality 112 installed in the first terminal 111 to use information and services provided by the business system 101 and further desires to simultaneously use the second modality 122 installed in the second terminal 121, then the link request data, wherein the authentication content sent from the association correspondence unit 131 is used, is sent to the server side via the second modality 122.

When the association correspondence unit 133 receives the link request data sent from the second modality 122 (23: report data), it executes the authentication process in accordance with the normal authentication means (24: perform authentication process). Here, because the received data is link request data and not authentication information, the authentication process fails, the received link request data is transferred to the modality associating unit 133, and a request is made to perform the matching process (25: if authentication fails, request the matching process).

The modality associating unit 133 compares the link request data that was sent with the association data stored in the session information table (26: perform matching process on the data in the database) and reports the matching modality session ID as the associated session ID to the association correspondence unit 131 (27: report associated session ID).

If the association correspondence unit 131 acquires the associated session ID as a result of the matching process performed by the modality associating unit 133, then it generates a session ID for the second modality that made a connection request (28: if matching is successful, generate session ID) and reports the session ID, the modality type information, and the associated session ID as the link information to the modality associating unit 133 (29: report session ID, modality type, and link session ID).

Based on the link information reported by the association correspondence unit 131, the modality associating unit 133 updates the session information table 135 stored in the session information storage unit 134 (30: register session ID, modality type, and link information in the database), As shown in the figure, if the session ID of the first modality 112 is "ABCDE01," and the session ID of the second modality 122 is "DKJEI02," then by associating the first modality 112 and the second modality 122, "DKJEI02," which is the session ID of the second modality 122, is stored in the associated session ID item of the first modality 112, and "ABCDE01," which is the session ID of the first modality 112, is stored in the associated session ID item of the second modality 122.

Subsequently, the system, wherein the modality managing unit 21 is a central part as shown in FIG. 1, is configured so as to provide information and services of the business system 101 while referencing the session information table 135 stored in the session information storage unit 134 and providing synchronization between the linked modalities.

<First Embodiment>

Figure 3:
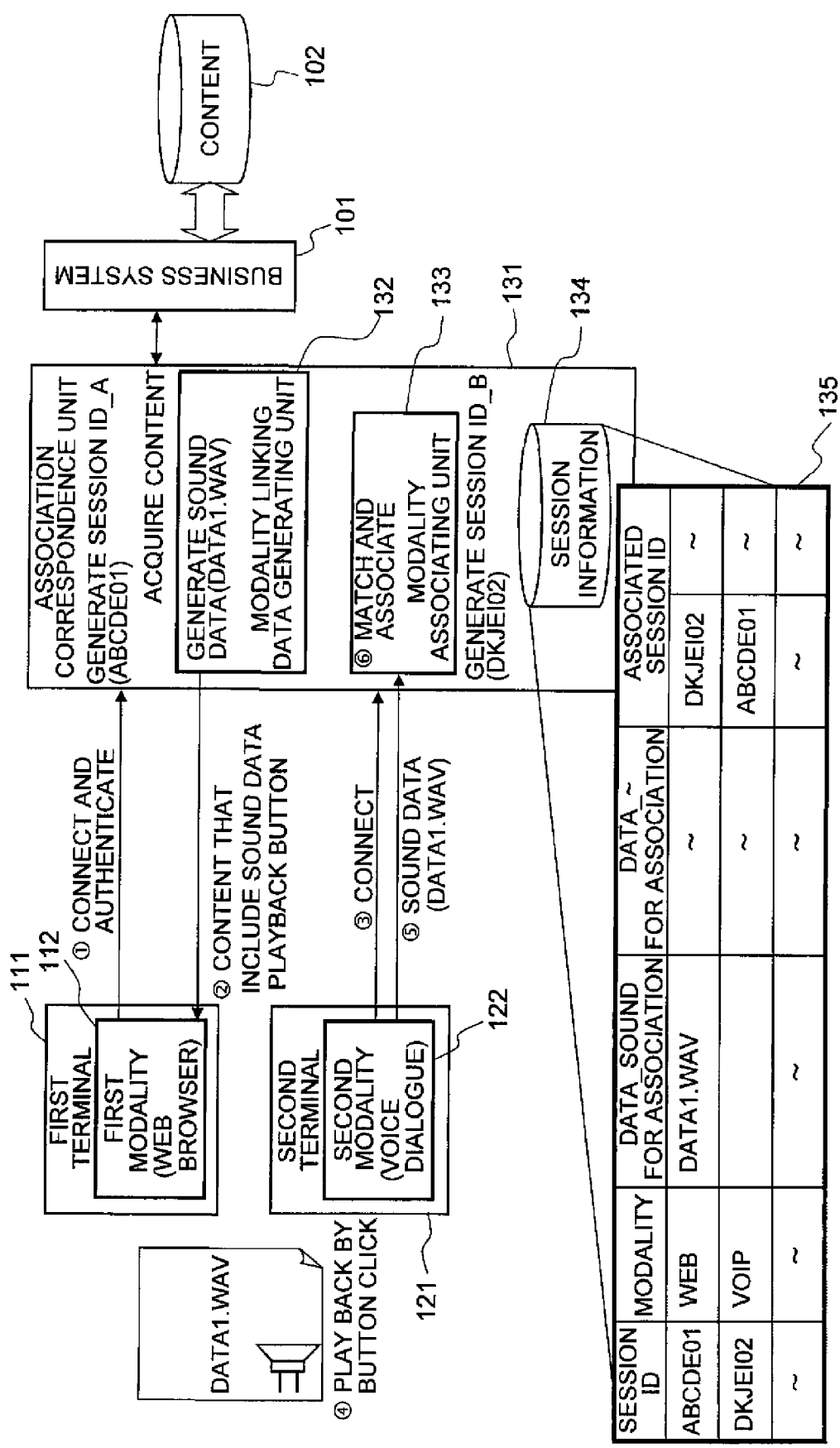
FIG. 3 is a control block diagram of a first embodiment of the present invention.

FIG. 3 shows as a first embodiment a case wherein the first modality 112 is a Web browser and the second modality 122 is a voice dialogue modality.

In this case, the first terminal 111, wherein the first modality 112 is installed, can be configured as, for example, a personal computer or a portable information terminal (PDA: personal digital assistant) and comprises a monitor that can display a Web browser, a speaker that outputs sound when sound data is played back, and an input device that receives data that is input to the Web browser as well as input for instructing sound data playback.

In addition, the second modality 122 can comprise a telephone terminal that includes, for example, a transmitting microphone, a receiving speaker, and key buttons for inputting numbers, and it is also conceivable to combine a CTI (computer telephony integration) system that integrates telephone functions in a computer with a headset connected thereto. If a CTI system is used as the second modality 122, then it is possible to configure the first terminal 111 and the second terminal 121 as the same computer system.

As discussed earlier, a request to link to the second modality 122 is received by the modality linking data generating unit 132 in a state wherein it is connected to the first modality 112, and consequently the modality linking data generating unit 132 generates association data. This time, the first modality 112 is a Web browser and the second modality 122 is a voice dialogue modality, and therefore sound data, which is capable of being vocalized by the first terminal 111 via an execution instruction, is generated as association data, appended to the content to be sent to the Web browser, and then sent thereto. The data format can be, for example, a wave file (WAV) and it is also possible to use a file that is compressed in a compression format such as MP3.

Figure 9:
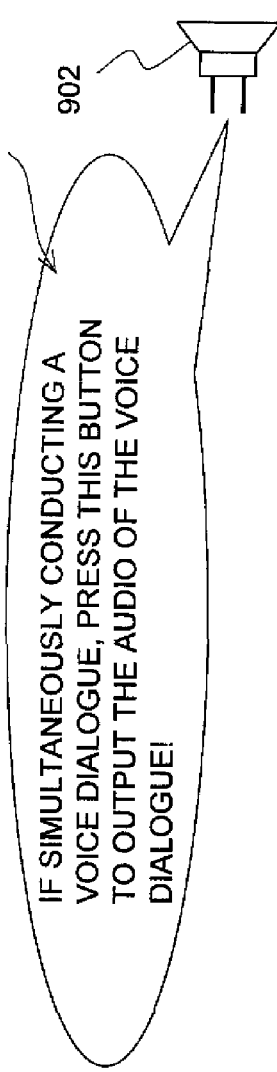
FIG. 9 is an explanatory diagram of a screenshot of content used in the first embodiment of the present invention.

The association data can be configured so that a link is pasted as an operation button in one part of the content sent to the first modality 112 and so that sound is output when the user clicks this link. For example, as shown in FIG. 9, if the content to be sent to the first modality 112 is a top page 901 of a "maintenance and inspection service system," then an operation button 902 is provided at the lower right part of the top page 901 and an operation guidance display unit 903, which is for prompting the user to operate the operation button 902, presents operation guidance to the user. Of course, the operation button 902 and the operation guidance display unit 903 are not limited to the layout example shown in the figure, i.e., their layout is flexible; furthermore, it is also possible to omit the operation guidance display unit 903.

If the user wishes to make a connection via the second modality 122, then a request to make a connection is made to the server side from the second terminal 121, the sound output from the speaker of the first terminal 111 with respect to the authentication content (in this case, guidance that instructs the user to perform voice input) sent from the server side is disposed so that it reaches the microphone of the second terminal 121, and the operation button 902 displayed on the first modality 112 is operated, thereby making it possible to send the link request data, which uses the association data, to the server side.

Based on the situation in the dialogue scenario, it is also possible to selectively send association data thought to improve user convenience when linking to the second modality 122. In addition, a configuration is also possible wherein the operation button 902 is provided to the information and services top page 901 as shown in FIG. 9, and the link to the second modality 122 is selected when starting a service; in addition, a configuration is possible wherein such association data and an operation button are always added to the content to be sent to the first modality 112, and are sent to the first modality 112 when a connection with the second modality 122 is not established. Furthermore, a configuration is also possible so that the content, wherein the association data is combined therewith, is generated at the point in time when a connection request is received from the second modality 122, and then sent to the first modality 112.

The sound data generated as association data can be generated as arbitrary, unique data, and can also be set to data that is generated based on, for example, the session ID assigned to the first modality 112, the date and time, or user authentication data.

The present embodiment can provide a system wherein, when linking a modality that uses a display, such as a Web browser, and a voice dialogue modality, such as a telephone terminal, it is possible to easily perform the link request when subsequently linking the voice dialogue modality without performing a complicated operation from the terminal wherein the voice dialogue modality is installed.

<Second Embodiment>

Figure 4:
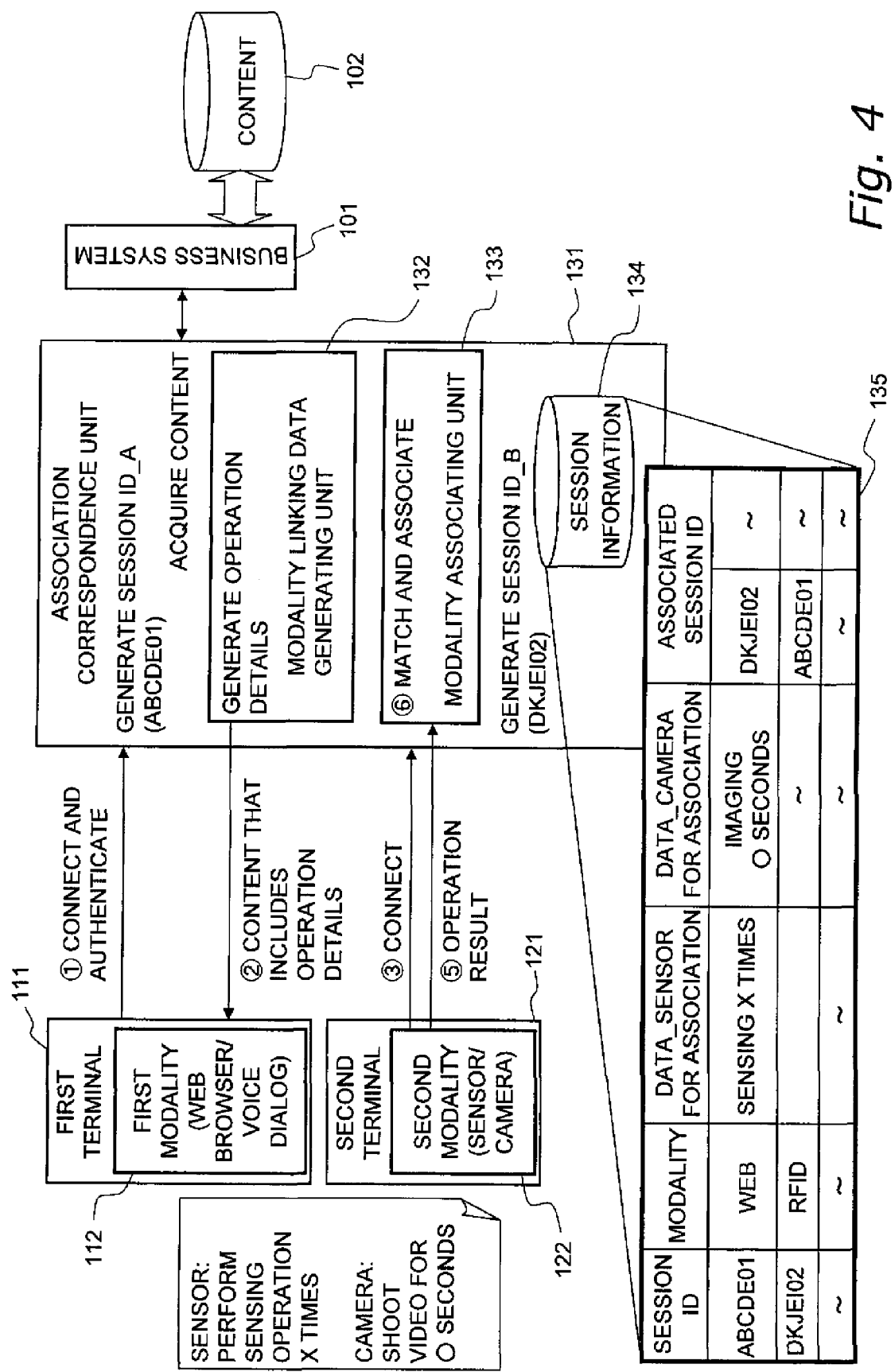
FIG. 4 is a control block diagram of a second, a third and a fourth embodiment of the present invention.

FIG. 4 shows as a second embodiment a case wherein the first modality 112 is a Web browser or a voice dialogue modality, and the second modality 122 is a video camera or any one of a variety sensors.

Herein, the association data generated by the modality linking data generating unit 132 relates to operation details of the second modality 122; if the first modality 112 is a Web browser, then the association data is combined with the content so that the operation details can be displayed in the content displayed by the Web browser. In addition, if the first modality 112 is a voice dialogue modality, then a configuration is possible wherein the operation details are conveyed by voice guidance.

The operation details used as the association data can be configured so that, for example, they give an instruction to the effect of, "Perform the sensing operation for the prescribed count," if the second modality 122 is a sensor, or an instruction to the effect of, "Perform imaging for the prescribed time," if the second modality 122 is a video camera.

In a case wherein the first modality 112 is a Web browser and the content to be sent to the first modality 112 is, for example, top page 1001 of the "maintenance and inspection service system" as shown in FIG. 10, content that includes association data is sent, wherein operation details information 1002 is combined therewith at the blank space on the lower part of the top page 1001 as association data.

In a case wherein the user wants to use the second modality 122, a request is made from the second modality 122 to connect to the server side, and the second modality 122 is operated in accordance with the operation details information 1002 displayed by the Web browser, which is the first modality 112, thus making it possible to send the link request data.

In this case as well, based on the situation in the dialogue scenario, it is also possible to selectively send association data thought to improve user convenience when linking to the second modality 122, and a configuration is also possible wherein the association data and the operation button are always added to the content to be sent to the first modality 112 and are sent to the first modality 112 when a connection with the second modality 122 is not established. Furthermore, a configuration is also possible wherein the content, wherein the association data is combined therewith, is generated at the point in time when a connection request is received from the second modality 122, and sent to the first modality 112.

A temperature sensor, a pressure sensor, and various other sensors for acquiring on-site state information can be used as the sensor employed as the second modality 122, and it is also possible to employ, for example, a code reader for reading a one-dimensional or a two-dimensional code, such as a bar code or a QR code, affixed to a target object, or a code reader for reading an RFID tag code.

In such a case, even a video camera, various sensors, and the like that are not provided with an input device can easily link to the first modality 112. In addition, it is also possible to authenticate the second modality 122 to determine whether it is being used by a legitimate user based on whether the second modality 122 is operated in accordance with real time instructions based on operation details sent to the first modality 112, and it is thereby possible to prevent, for example, fraudulent use by a user.

<Third Embodiment>

In a case wherein the first modality 112 is a Web browser and the second modality 122 is a video camera, a configuration is possible wherein image data is sent as the association data. Such an apparatus can be configured as shown in FIG. 4, similar to that of the previously discussed second embodiment.

For example, as shown in FIG. 11, if a top page 1101 of the "maintenance and inspection service system" is sent to the first modality 112, then content is sent, wherein arbitrary image data 1102 is combined therewith at the blank space on the lower part of the top page 1101 as association data. Furthermore, a configuration is also possible wherein an operation guidance display unit 1103 that displays an operation instruction that prompts the user to perform an operation is provided and operation is guided in order to associate the second modality 122 with the first modality 112. Of course, the image data 1102 and the operation guidance display unit 1103 are not limited to the layout example shown in the figure, i.e., their layout is flexible; furthermore, it is also possible to omit the operation guidance display unit 1103.

It is possible to use arbitrary still image data and moving picture data as the image data 1102 that is sent as the association data, and it is also possible to use, for examples image data that is generated based on, for example, the session ID assigned to the first modality 112, the date and time, or user authentication data.

In a case wherein the user wants to use the second modality 122, the second modality 122 makes a connection request to the server side and the video camera, which is the second modality 122, images the image data 1102 displayed on the Web browser, which is the first modality 112, thus making it possible to send the link request data.

The modality associating unit 133 comprises an image recognition function and can be configured so that it compares the image data sent from the second modality 122 as the link request data with the image data sent to the first modality 112, and associates the second modality 122 with the first modality 112 if there is a match.

<Fourth Embodiment>

If the first modality 112 is a Web browser and the second modality 122 is a code reader that reads one dimensional or two-dimensional code data, such as a bar code or a QR code, then a configuration is possible wherein code data that has a format that corresponds to the code reader is sent as the association data. Similar to the second and third embodiments discussed above, the apparatus in this case can be configured as shown in FIG. 4.

Figure 12:
FIG. 12 is an explanatory diagram of a screenshot of content used in the fourth embodiment of the present invention.

For example, as shown in FIG. 12, when a top page 1201 of the "maintenance and inspection service system" is sent to the first modality 112, it is sent as content, wherein bar code data 1202 is combined therewith as association data at the blank space on the lower part of the top page 1201. Furthermore, a configuration is also possible wherein an operation guidance display unit 1203 that displays operation instructions to prompt the user to perform operations is provided and operation is guided in order to associate the second modality 122 with the first modality 112. Of course, the code data 1202 and the operation guidance display unit 1203 are not limited to the layout example shown in the figure, i.e., their layout is flexible; furthermore, it is also possible to omit the operation guidance display unit 1203.

It is possible to generate arbitrary, unique data as the code data 1202 that is sent as the association data, and it is also possible to use, for example, code data that is generated based on, for example, the session ID assigned to the first modality 112, the date and time, or user authentication data.

The example shown in the figure uses bar code data, but it is also possible to use a variety of code data as long as it is one dimensional or two-dimensional and can be displayed in a Web browser, e.g., it is possible to use a QR code, which is a two-dimensional code.

In a case wherein the user wants to use the second modality 122, the second modality 122 makes a connection request to the server side, and the code data 1202 displayed in the Web browser, which is the first modality 112, is scanned by the code reader, which is the second modality 122, thereby making it possible to send the link request data.

<Fifth Embodiment>

A configuration is possible wherein a plurality of verification data pairs are managed in the association correspondence unit 131 and it is determined whether to associate modalities by sending one part of a verification data pair as association data and comparing the other part of that verification data pair with the link request data sent from the user side as data that serves as a response to the first part of the verification data pair.

Figure 5:
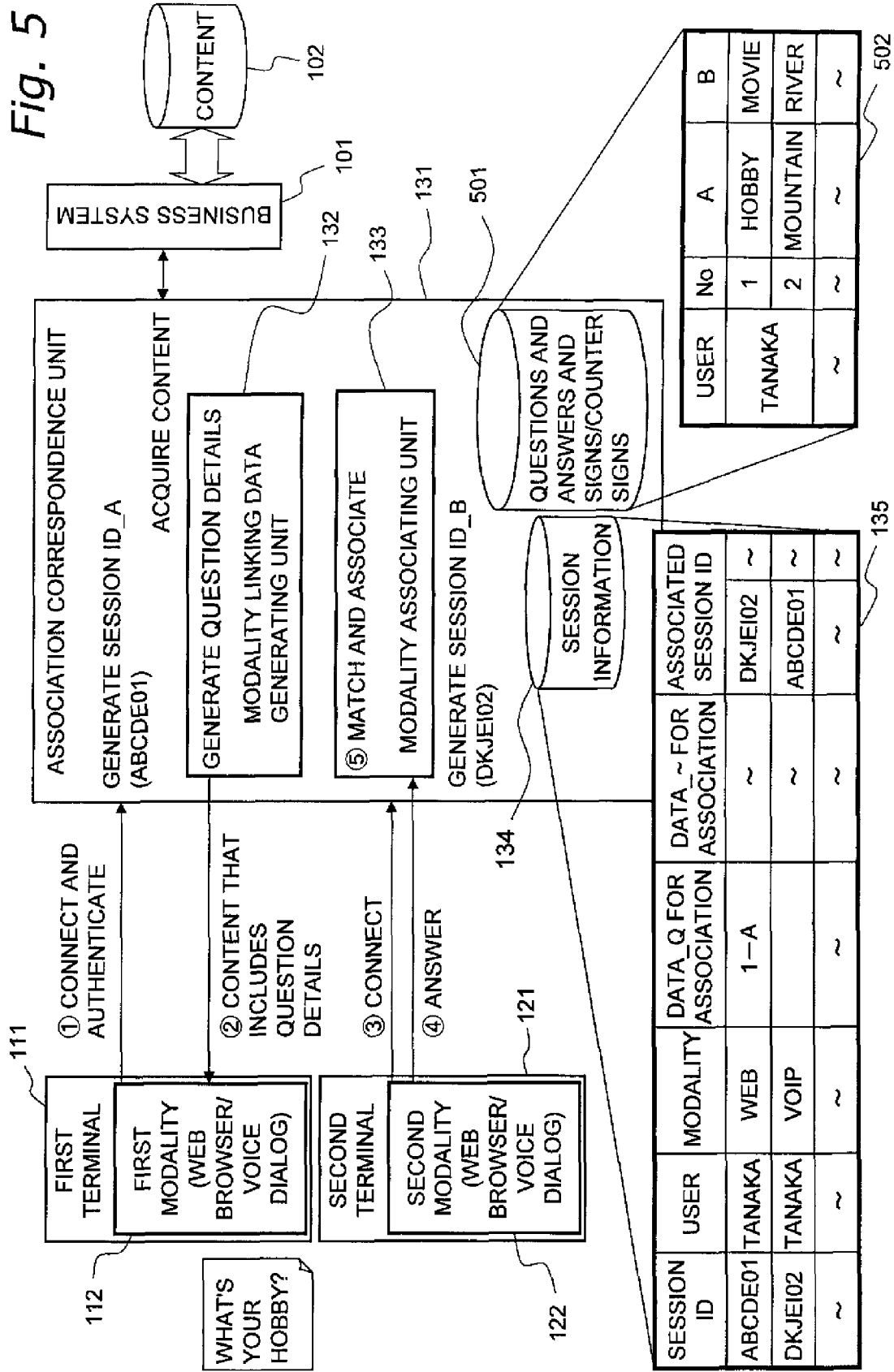
FIG. 5 is a control block diagram of a fifth embodiment of the present invention.

A question and an answer to that question or a sign/countersign and the like can be used as a verification data pair, e.g., as shown in FIG. 5, it is possible to use data pairs that are stored in a verification data pairs storage unit 501. A configuration is possible wherein the setting of a verification data pair of a question and an answer is received from the user beforehand, e.g., a question for which the answer for an individual user is unique, for example: "What's your hobby?"; "Where are you from?"; "What's your favorite color?"; and "What is your mother's maiden name?"; furthermore, the question and the corresponding answer from the user are stored in advance in a verification data table 502 as a verification data pair. In addition, a configuration is also possible wherein the sign/countersign comprises generally paired words, such as "mountain" and "river," or "day" and "night," or a pair of words set by the user, and the pair is stored in the verification data table 502. A configuration is possible wherein a plurality of verification data pairs is prepared in advance for questions and answers and signs/countersigns; in addition, it is also possible to register a mixture of questions and answers and signs/countersigns.

In this case, it is possible to adapt the invention to the case wherein the data output format of one part of the verification data pair sent as the association data is different from the data input format of the link request data inputted by the user in response thereto, as when the first modality 112 is a Web browser and the second modality 122 is a voice dialogue modality, or when the first modality 112 is a voice dialogue modality and the second modality 122 is a Web browser.

FIG. 13 shows an example of content that includes association data that is sent to the first modality 112 in a case wherein the first modality 112 is a Web browser and the second modality 122 is a voice dialogue modality.

In the case wherein a top page 1301 of the "maintenance and inspection service system" as shown in FIG. 13 is sent, content that includes association data is sent, wherein question data 1302 (which is one part of the verification data pair) is pasted as association data and combined therewith at the blank space on the tower part of the top page 1301. A configuration is possible wherein the question data 1302, which is used as the association data, is arbitrarily selected from the verification data pairs stored in the verification data table 502.

If the user wishes to use the second modality 122, then the second modality 122 makes a connection request to the server side, and the answer to the question data 1302 displayed on the Web browser, which is the first modality 112, is input from the second modality 122. If the second modality 122 is a voice dialogue modality, then a configuration is possible wherein the answer to the question data 1302 is input by voice via the voice dialogue modality. In addition, if it is possible for the second modality 122 to input data using, for example, a keyboard or a pointing device, then a configuration is possible wherein the answer is input using such.

In this case as well, based on the situation in the dialogue scenario, it is also possible to selectively send association data thought to improve user convenience when linking to the second modality 122, and a configuration is also possible wherein such association data is always appended to the content to be sent to the first modality 112 and sent when a connection with the second modality 122 is not established. Furthermore, a configuration is also possible wherein the content that is combined with the association data is generated at the point in time when a connection request is received from the second modality 122, and then sent to the first modality 112.

If the second modality 122 is a voice dialogue modality, then the answer data that is sent as the link request data is the user's voice input, and therefore the matching process is performed by performing voice recognition at the server side on the answer data that was sent and then referencing the verification data table 502 and the association data in the session information table 135.

If the system is so configured, it is possible to easily associate multiple modalities and to prevent illegal access such as by spoofing.

<Sixth Embodiment>

Figure 6:
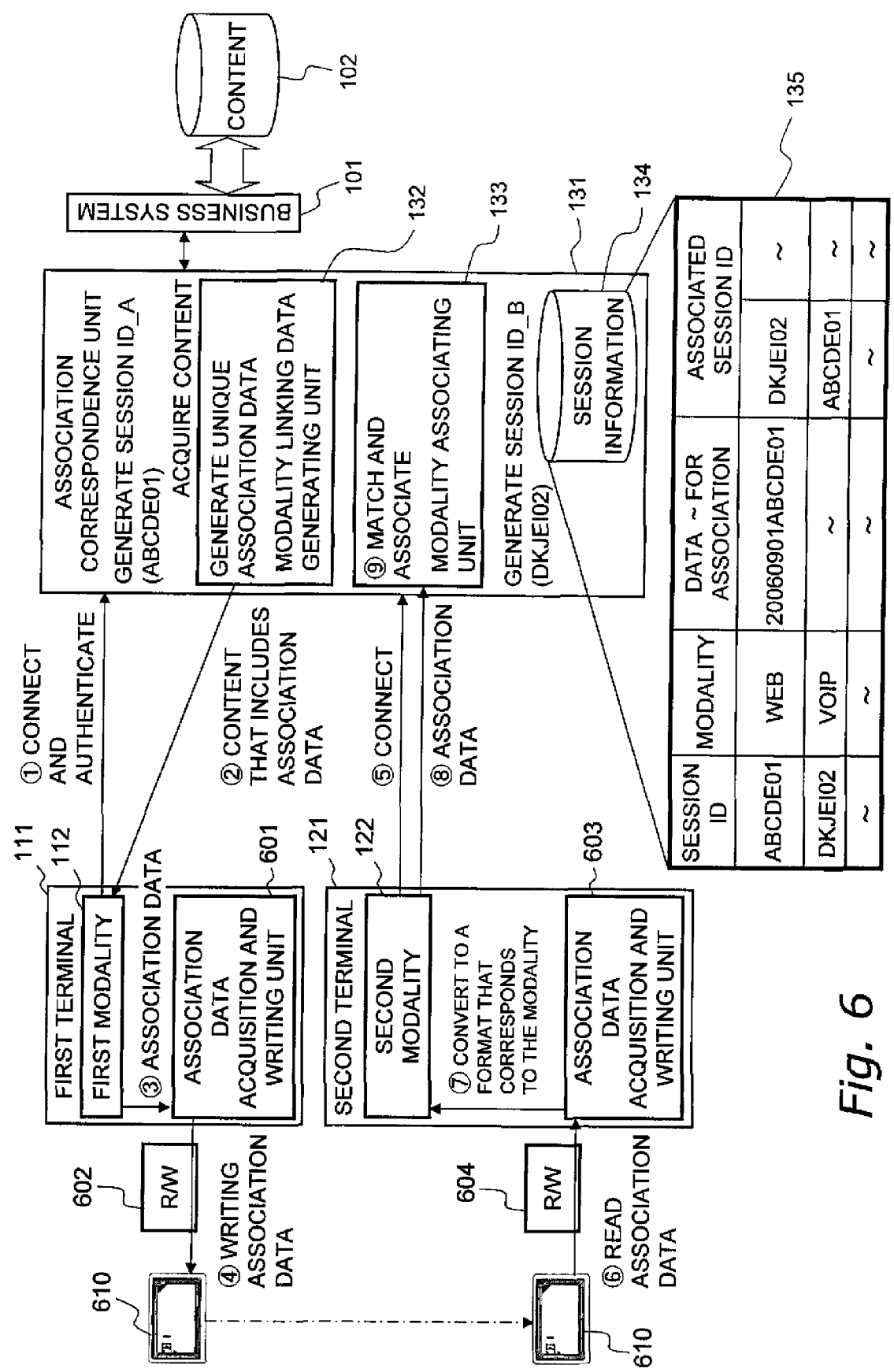
FIG. 6 is a control block diagram of a sixth embodiment of the present invention.

If each terminal used by the user is provided with a device for reading and writing the data stored on a portable storage medium, then a configuration is possible wherein the second modality reads the association data stored on the storage medium and sends such as link request data. FIG. 6 shows such a case as a sixth embodiment.

Here, a variety of data can be used as the association data generated by the modality linking data generating unit 132, e.g., arbitrary code data, text data, image data, sound data, data generated based on the session ID of the first modality 112, the date and time, data generated based on user authentication data, and data in various other formats provided that its volume can be stored on the portable storage medium. The example shown in the figure is configured so that the data of "20060901ABCDE01," which constitutes a combination of a date and alphanumeric characters, is generated as the association data, which is combined with the content to be sent to the first modality 112 and then sent thereto.

The first terminal 111 wherein the first modality 112 is installed and the second terminal 121 wherein the second modality 122 is installed are provided with reader/writers 602, 604, respectively, which are capable of reading and writing data from and to portable storage media 610 that are the same type. A variety of storage media can be used as the portable storage media 610 such as an SD memory card, a memory stick, CompactFlash™, a flexible disk, MD, CD-R, CD-RW, MO, or an RFID tag.

The first terminal 111 comprises an association data acquisition and writing unit 601, which acquires association data included in the content sent to the first modality 112, and writes such to the storage medium 610 via the reader/writer 602. The association data included in the content sent to the first modality 112 is read by the association data acquisition and writing unit 601 and stored in the storage medium 610 via the reader/writer 602.

In addition, the second terminal 121 reads the association data stored in the storage medium 610 mounted in the reader/writer 604, converts such to a format that corresponds to the second modality 122, and sends the converted association data as the link request data to the server side by using the second modality 122.

If so constituted, the association data can be set to an arbitrary data format and, regardless of the modality type of the second modality 122, the second modality 122 can be easily associated with the first modality 112.

<Seventh Embodiment>

Figure 7:
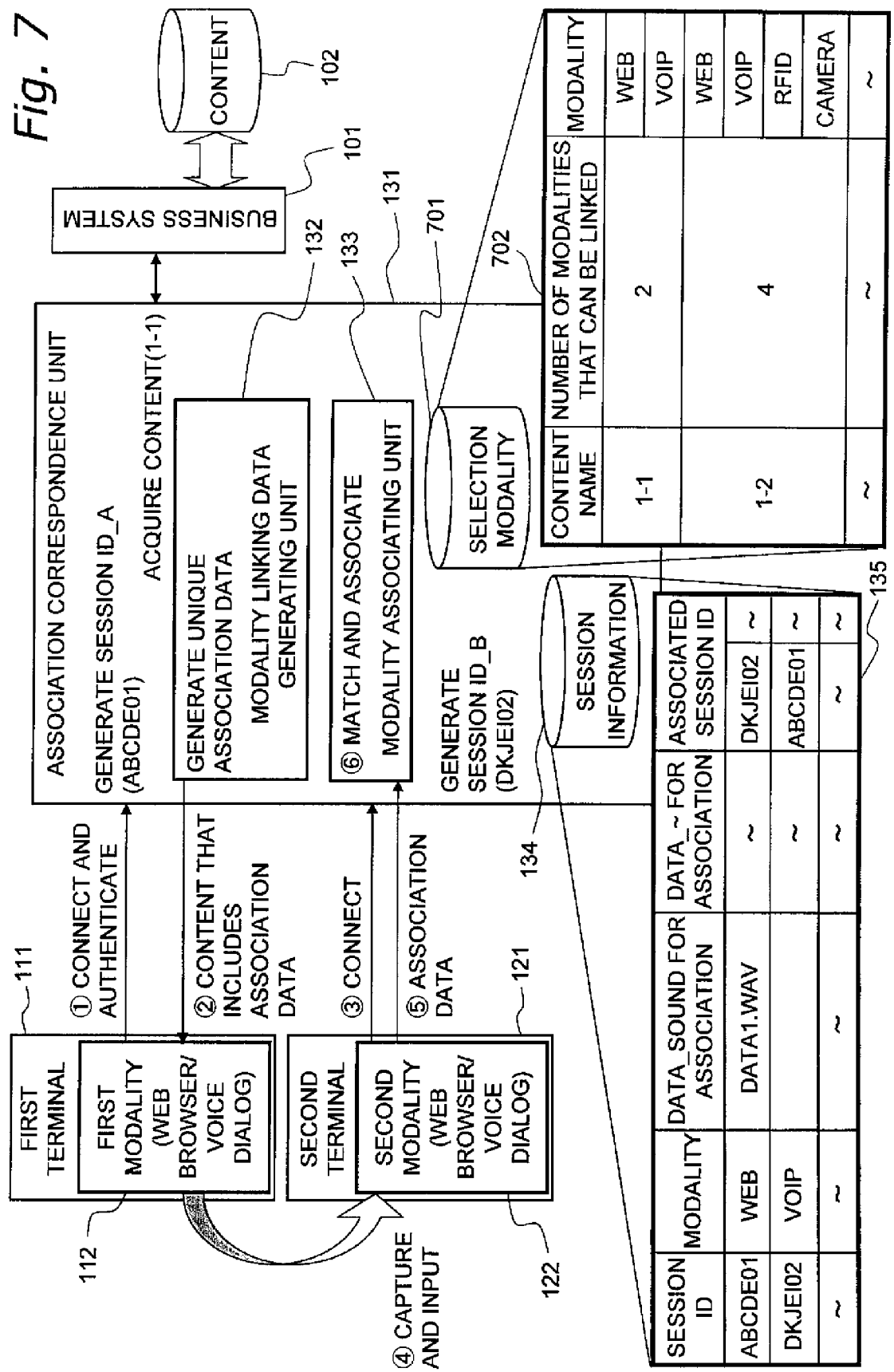
FIG. 7 is a control block diagram of a seventh embodiment of the present invention.

A configuration is possible wherein, for each content item, the modalities that can be linked are preset, and association data that corresponds to each content item is generated and then combined with the content and sent. An example of such a case is explained by the control block diagram in FIG. 7.

The association correspondence unit 131 comprises a selection modality storage unit 701 that, for each content item, stores the modalities that can be linked and manages the content name, the number of modalities that can be linked, and the modality type in the form of a selection modality table 702 that creates a correspondence therefor. In the example shown in the figure, for the content (1-1), the number of modalities that can be linked is two and the modality types are a Web browser and a voice dialogue modality (VoIP); for the content (1-2), the number of modalities that can be linked is four and the modality types are a Web browser, a voice dialogue modality (VoIP), an RFID tag, and a video camera.

When the association correspondence unit 131 acquires the content to be sent to the first modality 112 from the business system 101, it reports the content name to the modality linking data generating unit 132 and requests that association data be generated. The modality linking data generating unit 132 references the selection modality table 702 stored in the selection modality storage unit 701 and if there are other modalities that can be linked for that content name, then association data is generated for those modalities.

If the first modality 112 is a Web browser, the second modality 122 is a voice dialogue modality, and content (1-1) is to be sent to the first modality 112, then association data of a type that corresponds to the voice dialogue modality is generated, combined with the content (1-1), and then sent. In this case, it is possible to configure the content that includes association data so that the operation button 902, which is capable of giving an instruction to output sound data, is pasted in the Web page 901, as shown in FIG. 9.

Figure 14:
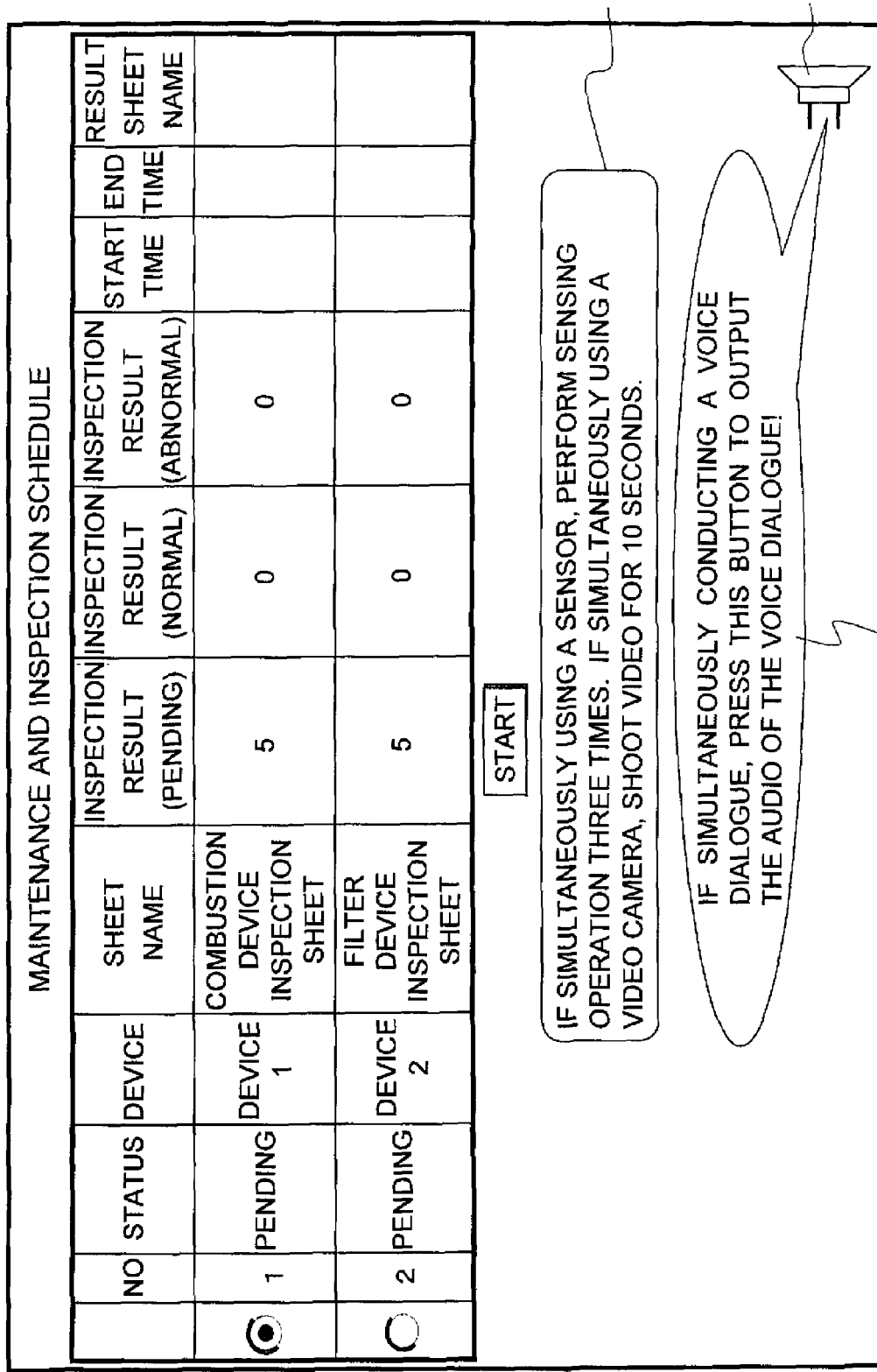
FIG. 14 is an explanatory diagram of a screenshot of content used in the seventh embodiment of the present invention.
Figure 15:
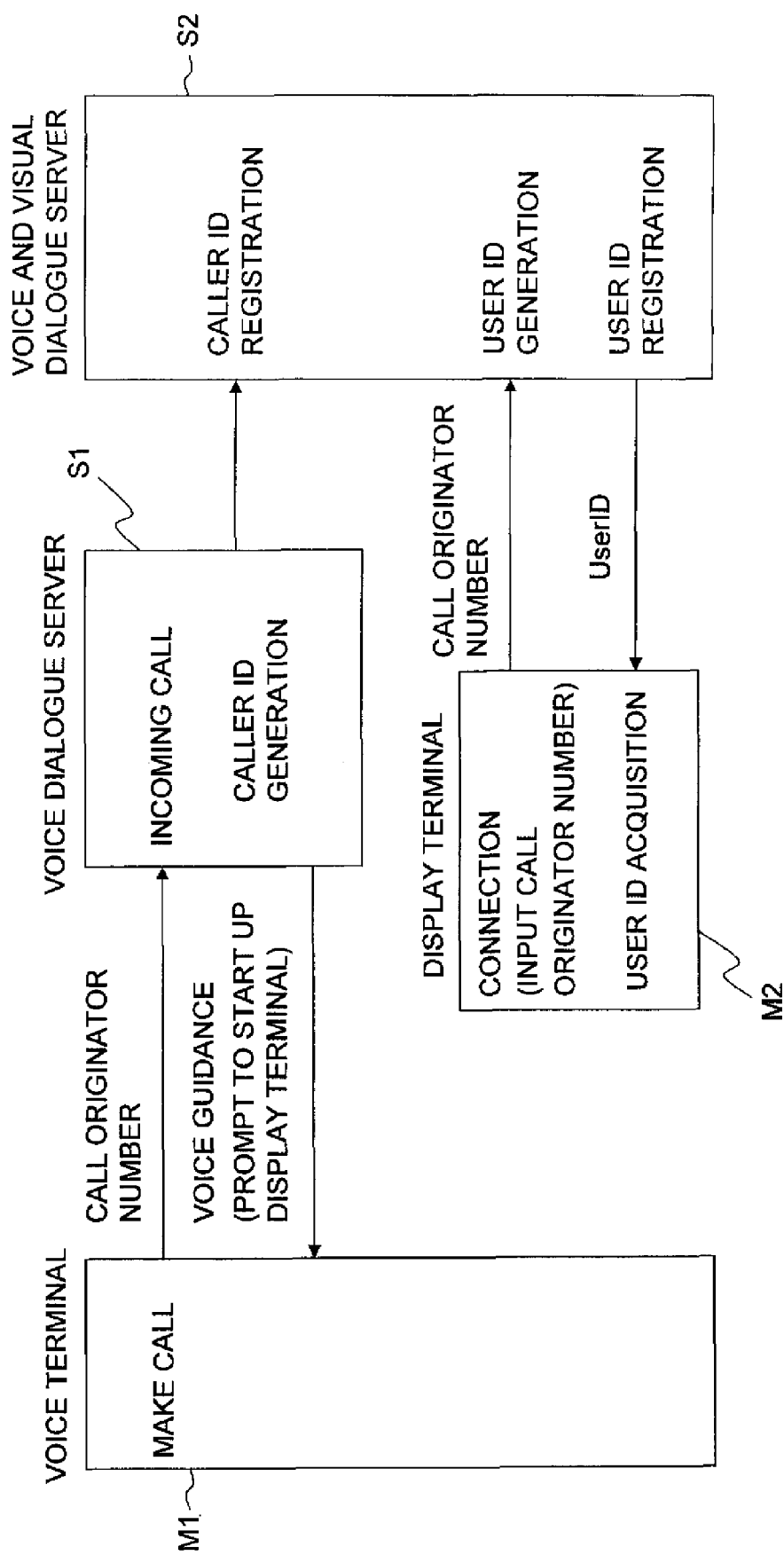
FIG. 15 is an explanatory diagram of the related art.
Figure 16:
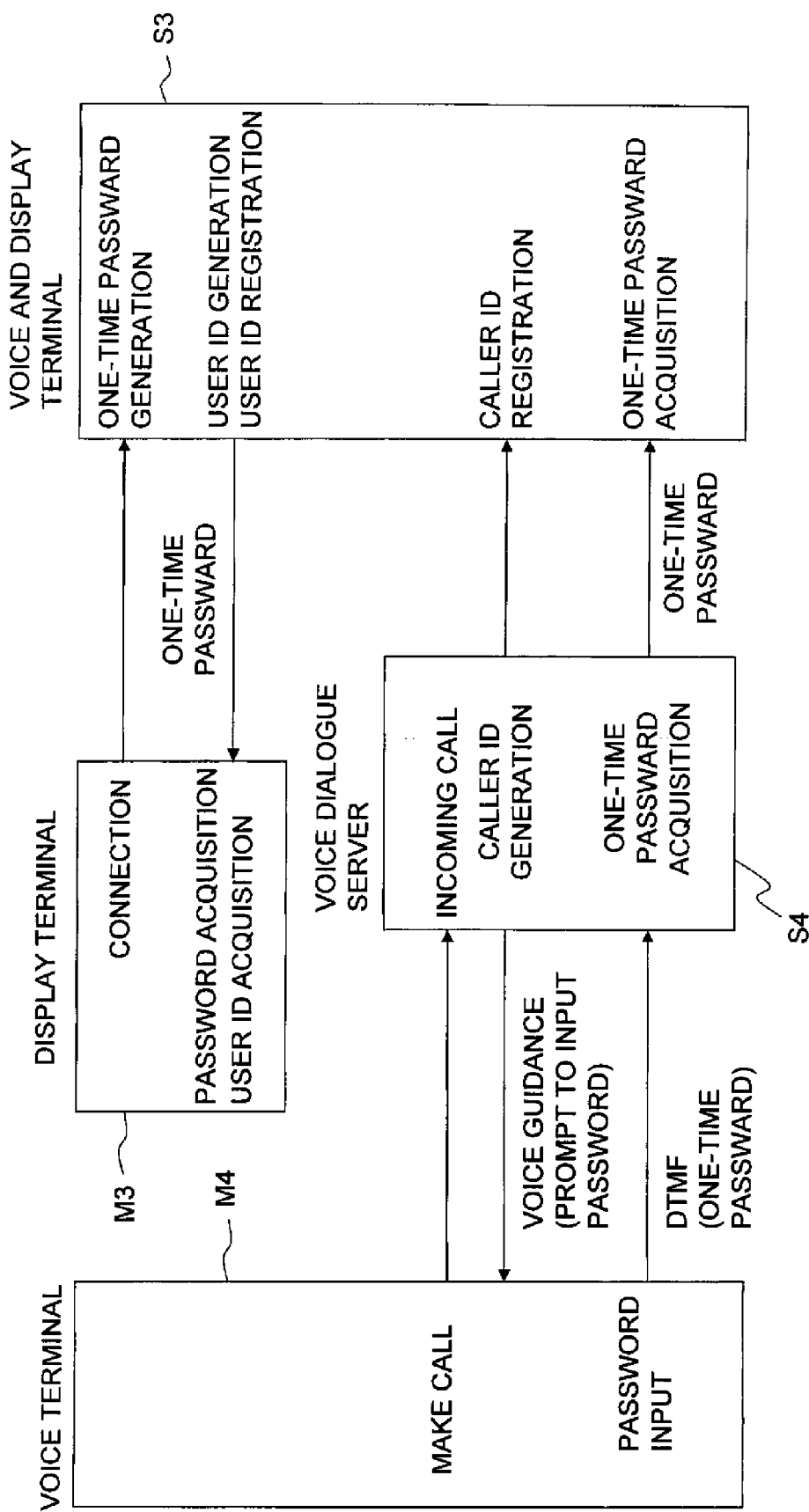
FIG. 16 is an explanatory diagram of the related art.

In addition, if content (1-2) is to be sent to the first modality 112, which is a Web browser, then a configuration is possible wherein association data is generated for a voice dialogue modality (VoIP), an RFID tag, and a video camera, pasted in the content, and sent as the content that includes association data to the first modality 112. FIG. 14 shows a screenshot of content in a Web browser for this case. Here, an operation button 1402 for outputting sound data, an operation guidance display unit 1403 that displays operation guidance for that sound data, and operation details information 1404 that displays operation guidance for the sensor and the video camera are combined as the association data for the voice dialogue modality and displayed at the blank space on the lower part of a Web page 1401.

Adopting such a configuration makes it possible to inform the user of other modalities to which he or she can link via the sent content, thereby enhancing the ease of operation when the user receives information and services, and it is also possible to easily associate modalities.

<Eighth Embodiment>

A configuration is also possible wherein the association correspondence unit acquires positional information of each modality and associates just the modalities that have a prescribed positional relationship.

In cases such as when the installation location of a terminal, wherein a modality is installed, is preregistered, it is possible to acquire the positional information of the modality from this registration information.

In addition, in cases such as when each terminal is provided with a GPS function, it is possible to acquire the positional information of each modality based on the positional information from the GPS.

In cases such as when there are multiple modalities to which a response has been sent using the association data that was sent to the first modality, a configuration is possible wherein, based on the positional information of the type discussed above, a modality that is at the position closest to the first modality is associated therewith.

Adopting such a configuration makes it possible to prevent illegal access, such as by spoofing.

When providing information and services using a multimodal system, the present invention facilitates the procedure of associating multiple modalities and makes it possible to simply associate even modalities that are not provided with a manual data input device.

What is claimed is:

1. A method of associating multiple modalities in a multimodal managing system that sends content that corresponds to multiple, simultaneously connected, different modalities and receives input data sent therefrom, and provides information and services via a network based on a prescribed dialogue scenario that is synchronized among the modalities, comprising:

based on a connection request from a first modality of the plurality of modalities, generating a first connection identifier and storing the correspondence between the first connection identifier and the first modality in a session information table;

generating association data needed in order to associate a second modality and the first modality of the plurality of modalities, updating the session information table so that the association data and the first connection identifier correspond, generating content that includes association data, wherein the association data is combined with the content to be sent to the first modality, and then sending the generated content that includes association data to the first modality;

upon receiving link request data that was sent by the second modality which is not yet synchronized to the first modality using the association data included in the content that includes association data sent to the first modality, comparing the link request data and the association data stored in the session information table, and determining whether to associate the second modality with the first modality;

when it is determined to associate the second modality with the first modality, generating a second connection identifier for the connection with the second modality, and updating the session information table with the link information that establishes a correspondence between the second connection identifier and the first connection identifier;

acquiring positional information of the plurality of modalities;

based on the positional information of the plurality of modalities, selecting only the modality that is at a prescribed position with respect to the first modality and generating association data therefor.

2. A hardware computer-readable storage medium storing a program that causes a computer to execute a method of associating multiple modalities in a multimodal managing system that sends content that corresponds to multiple, simultaneously connected, different modalities and receives input data sent therefrom, and provides information and services via a network based on a prescribed dialogue scenario that is synchronized among the modalities, the method comprising:

based on a connection request from a first modality of the plurality of modalities, generating a first connection identifier and storing the correspondence between the first connection identifier and the first modality in a session information table;

generating association data needed in order to associate a second modality and the first modality of the plurality of modalities, updating the session information table so that the association data and the first connection identifier correspond, generating content that includes association data, wherein the association data is combined with the content to be sent to the first modality, and then sending the generated content that includes association data to the first modality;

upon receiving link request data that was sent by the second modality which is not yet synchronized to the first modality using the association data included in the content that includes association data sent to the first modality, comparing the link request data and the association data stored in the session information table, and determining whether to associate the second modality with the first modality;

when it is determined to associate the second modality with the first modality, generating a second connection identifier for the connection with the second modality, and updating the session information table with the link information that establishes a correspondence between the second connection identifier and the first connection identifier;

acquiring positional information of the plurality of modalities;

based on the positional information of the plurality of modalities, selecting only the modality that is at a prescribed position with respect to the first modality and generating association data therefor.

3. The hardware computer-readable storage medium according to claim 2, comprising:

a selection modality table that, for each content item, establishes a correspondence with a modality of the plurality of modalities that can be linked;

wherein, the association data is generated based on the selection modality table.

4. A multimodal managing system that sends content that corresponds to multiple, simultaneously connected, different modalities and receives input data sent therefrom, and provides information and services via a network based on a prescribed dialogue scenario that is synchronized among the modalities, comprising:

a hardware modality linking data generating unit that generates association data in order to associate a first modality and a second modality of the plurality of modalities;

an association correspondence unit that manages connection information related to connections with each modality and link information related to links between modalities, acquires content to be sent to the first modality, and sends content that includes association data, wherein association data combined with the acquired content, to the first modality;

a session information storage unit that stores the correspondence among the connection information of each modality managed by the association correspondence unit, the link information about the links between the modalities, and the association data generated by the modality linking data generating unit as a session information table;

a modality associating unit that receives link request data sent from the second modality which is not yet synchronized to the first modality using the association data included in the content that includes association data, executes a matching process that compares the link request data with the association data stored in the session information storage unit, and updates the session information table stored in the session information storage unit based on the matching results; and a verification data storage unit that stores a plurality of verification data pairs;

wherein, the modality linking data generating unit selects one part of a verification data pair stored in the verification data storage unit as association data; and the modality associating unit executes the matching process by comparing the link request data that was sent using the association data with the other part of the verification data pair.

5. A multimodal managing system according to claim 4, wherein the plurality of modalities includes: a Web browser that is capable of interactive communication via a network; and a voice dialogue modality, which is capable of interactive voice dialogue via the network and is disposed in an environment wherein voice played back by the Web browser can be input;

the modality linking data generating unit generates sound data, which can be played back by the Web browser, as association data, combines such with the content to be sent to the Web browser and then sends it thereto; and the modality associating unit receives, as link request data, the sound data that was played back by the Web browser and sent via the voice dialogue modality, and executes the matching process.

6. A multimodal managing system according to claim 4, wherein the plurality of modalities includes a Web browser, which is capable of interactive communication via a network, and a state information acquisition modality, which is capable of acquiring and sending state information about the surroundings of a user;

the modality linking data generating unit generates operation guidance display data, which is for providing instructions in the Web browser regarding the operation details of the state information acquisition modality, as the association data, combines such with the content to be sent to the Web browser and then sends it thereto; and as a result of the user's operation of the state information acquisition modality in accordance with the operation guidance display data, the modality associating unit receives the state information sent from the state information acquisition modality as the link request data, and then executes the matching process.

7. A multimodal managing system according to claim 4, wherein the plurality of modalities includes a Web browser, which is capable of interactive communication via a network, and a video camera, which is capable of acquiring and sending image data of the user's surroundings;

the modality linking data generating unit generates unique image data, which can be displayed in the Web browser, as the association data, combines such with the content to be sent to the Web browser and then sends it thereto; and the modality associating unit receives the image data displayed in the Web browser and taken by the video camera as the link request data, and then executes the matching process.

8. A multimodal managing system according to claim 4, wherein the plurality of modalities includes a Web browser, which is capable of bi-directionally sending and receiving data via a network, and a code scanner, which is capable of reading code data displayed in the Web browser;

the modality linking data generating unit generates unique code data, which can be displayed in the Web browser, as the association data, combines such with the content to be sent to the Web browser and then sends it thereto; and the modality associating unit receives the code data displayed in the Web browser and read by the code scanner as the link request data, and then executes the matching process.

* * * * *